(12) United States Patent
Rufus et al.

(10) Patent No.: US 12,502,689 B2
(45) Date of Patent: Dec. 23, 2025

(54) ROOFING MEMBRANE, AND ASSOCIATED METHOD

(71) Applicant: BMIC LLC, Dallas, TX (US)

(72) Inventors: Isaac Bernard Rufus, Newark, DE (US); Adem Chich, Kearny, NJ (US); Overton Williams, Paterson, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 19/009,367

(22) Filed: Jan. 3, 2025

(65) Prior Publication Data

US 2025/0222490 A1 Jul. 10, 2025

Related U.S. Application Data

(60) Provisional application No. 63/618,031, filed on Jan. 5, 2024.

(51) Int. Cl.
| | |
|---|---|
| *B05D 5/06* | (2006.01) |
| *B05D 3/02* | (2006.01) |
| *D06N 5/00* | (2006.01) |
| *E04D 5/12* | (2006.01) |

(52) U.S. Cl.
CPC .......... *B05D 5/063* (2013.01); *B05D 3/0254* (2013.01); *D06N 5/003* (2013.01); *E04D 5/12* (2013.01)

(58) Field of Classification Search
CPC .... D06N 5/003; E04D 2001/005; E04D 5/10; E04D 5/12; B32B 11/04; B32B 11/046; B32B 11/12; C04B 26/26
USPC .................................................. 427/186, 187
See application file for complete search history.

(56) References Cited

U.S. PATENT DOCUMENTS

| | | | |
|---|---|---|---|
| 5,308,676 A | 5/1994 | Gelles et al. | |
| 6,360,506 B1 | 3/2002 | Graae | |
| 6,933,007 B2* | 8/2005 | Fensel | E04F 15/02 |
| | | | 427/205 |
| 7,291,358 B1* | 11/2007 | Fensel | E04D 5/12 |
| | | | 427/188 |
| 7,820,237 B2* | 10/2010 | Harrington, Jr. | B32B 17/04 |
| | | | 427/188 |
| 8,435,599 B1 | 5/2013 | Standeford et al. | |
| 9,677,281 B2* | 6/2017 | Standeford | B05D 3/12 |
| 9,834,935 B2 | 12/2017 | Loftus et al. | |
| 10,246,879 B2* | 4/2019 | Shiao | C04B 35/636 |
| 10,392,805 B2* | 8/2019 | Mishler | B05C 19/008 |
| 11,136,760 B2* | 10/2021 | Kragten | E04D 1/20 |
| 11,724,281 B2* | 8/2023 | Mishler | B05C 19/06 |
| | | | 427/188 |
| 2002/0187306 A1* | 12/2002 | Joedicke | C09C 1/642 |
| | | | 428/404 |

(Continued)

FOREIGN PATENT DOCUMENTS

| | | | | |
|---|---|---|---|---|
| EP | 0634515 A1 * | 1/1995 | | B32B 27/12 |
| WO | 2004/015216 A1 | 2/2004 | | |

*Primary Examiner* — William P Fletcher, III
(74) *Attorney, Agent, or Firm* — GREENBERG TRAURIG, LLP

(57) ABSTRACT

An asphaltic roofing membrane is produced by applying asphaltic material to reinforcement, adding first granules without preheating, removing loose granules, applying second granules without preheating, heating the membrane and then cutting the asphaltic membrane; and rolling the cut membrane. The process supports granules of varying sizes, materials, and colors, resulting in a durable, high-reflectance roofing membrane.

17 Claims, 3 Drawing Sheets

(56) References Cited

U.S. PATENT DOCUMENTS

2007/0107372 A1* 5/2007 Harrington, Jr. ......... E04D 1/20
                                                                52/746.11
2019/0184678 A1* 6/2019 LaTorre .................. E04D 7/005
2019/0186144 A1* 6/2019 LaTorre .................... E04D 1/28
2023/0357083 A1* 11/2023 Hill ..................... C04B 20/0048

* cited by examiner

ROOFING MEMBRANE, AND ASSOCIATED METHOD

CROSS-REFERENCE TO RELATED APPLICATIONS

The present application claims priority to U.S. provisional patent application No. 63/618,031, filed Jan. 4, 2024, and entitled "ROOFING MEMBRANE, AND ASSOCIATED METHOD," the entirety of which is incorporated herein by reference.

FIELD

The present invention is directed to a roofing membrane, and, more specifically, to a roofing membrane with granules applied to a top surface.

BACKGROUND

In a known roofing system, a roofing membrane is installed on a roofing substrate. The known roofing membrane includes granules on a top surface.

SUMMARY OF THE INVENTION

In some embodiments, the techniques described herein relate to a method of manufacturing an asphaltic roofing membrane, including: applying an asphaltic material to a reinforcement material to form an asphaltic membrane; applying a first granules to a top surface of the asphaltic membrane to form a granular asphaltic membrane; wherein the asphaltic membrane is not heated prior to or during the step of applying the first granules; removing at least some of the first granules that has not adhered to the asphaltic membrane; applying a second granules to the granular asphaltic membrane to form an asphaltic roofing membrane; wherein the granular asphaltic membrane is not heated prior to or during the step of applying the second granules; heating the asphaltic roofing membrane.

In some embodiments, the techniques described herein relate to a method wherein, during the applying steps for at least the first and second granules, the asphaltic membrane is in a generally planar configuration. In some embodiments, the granular applying steps are not applied on a stretched membrane (e.g. over a roll).

In some embodiments, the techniques described herein relate to a method wherein the heating step includes heating the asphaltic roofing membrane to between 200 to 250 degrees Fahrenheit.

In some embodiments, the techniques described herein relate to a method wherein the asphaltic roofing membrane is cut and rolled.

In some embodiments, the techniques described herein relate to a method wherein at least the first granules, the second granules or the combination thereof are reflective granules.

In some embodiments, the techniques described herein relate to a method wherein at least the first granules, the second granules or the combination thereof are different sizes, material, and/or colors, thereby creating different design elements.

In some embodiments, the techniques described herein relate to a method wherein the heating step includes heating the asphaltic roofing membrane with an external heating source selected from the group consisting of IR heater, an oven, a hot air blower or any combination thereof.

In some embodiments, the techniques described herein relate to a method wherein the reinforcement materials include one or more of, or all of, a glass reinforcement material, a polyester reinforcement material, a polyester reinforcement material, a scrim material, and/or a polymer reinforcement material, and/or combinations thereof.

In some embodiments, the techniques described herein relate to a method wherein the asphaltic material includes one or more of, or all of, of oxidized asphalt, or styrene-butadiene-styrene (SBS) modified asphalt, atactic polypropylene (APP) modified asphalt, and/or polymer modified asphalt, and/or combinations thereof.

In some embodiments, the techniques described herein relate to a method wherein the heated asphaltic roofing membrane exhibits a solar reflectance of at least 0.70 before aging.

In some embodiments, the techniques described herein relate to a method wherein the heated asphaltic membrane exhibits a solar reflectance of at least 0.65 after rapid aging testing in accordance with ASTM D7897-15.

In some embodiments, the techniques described herein relate to a method wherein the second granules are relatively smaller than the first granules.

In some embodiments, the techniques described herein relate to a method of manufacturing an asphaltic roofing membrane, including: applying an asphaltic material to a reinforcement material to form an asphaltic membrane; preheating first granules; applying the first granules to a top surface of the asphaltic membrane to form a granular asphaltic membrane; wherein the asphaltic membrane is not heated prior to or during the step of applying the first granules; removing at least some of the first granules that has not adhered to the asphaltic membrane; applying a second granules to the granular asphaltic membrane to form an asphaltic roofing membrane; wherein the granular asphaltic membrane is not heated prior to or during the step of applying the second granules; heating the asphaltic roofing membrane.

In some embodiments, the techniques described herein relate to the method wherein, prior to applying the second granules, preheating the second granules.

In some embodiments, the techniques described herein relate to a method wherein the heating step of at least the first granules, second granules or combination thereof includes heating the granules to between 150 to 250 degrees Fahrenheit.

In some embodiments, the techniques described herein relate to a method wherein the asphaltic roofing membrane is cut and rolled.

In some embodiments, the techniques described herein relate to a method wherein at least the first granules, the second granules or the combination thereof are reflective granules.

In some embodiments, the techniques described herein relate to a method wherein at least the first granules, the second granules or the combination thereof are different sizes, material, and/or colors, thereby creating different design elements.

In some embodiments, the techniques described herein relate to a method wherein the heating step of the granules includes heating the granules with an external heating source selected from the group consisting of IR heater, an oven, a hot air blower or any combination thereof.

In some embodiments, the techniques described herein relate to a method wherein the heating step includes heating the asphaltic roofing membrane with an external heating source selected from the group consisting of IR heater, an oven, a hot air blower or any combination thereof.

BRIEF DESCRIPTION OF THE DRAWINGS

This section refers to the drawings that form a part of this disclosure, and which illustrate some of the embodiments of structure, materials, and/or methods of the present invention described herein.

DETAILED DESCRIPTION

Figure 1:
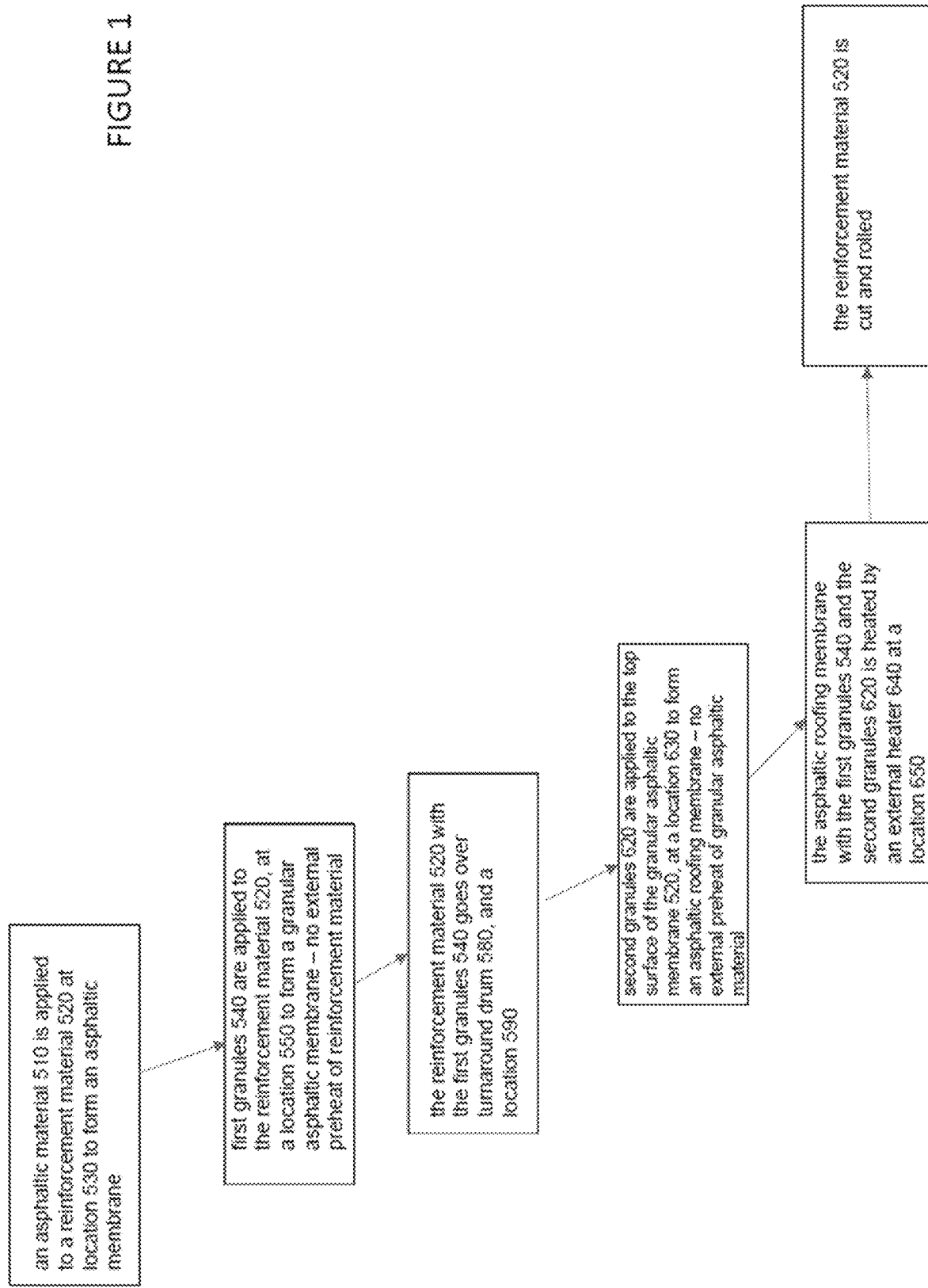
FIG. 1 is a flowchart illustrating a process of manufacturing a roofing membrane, in accordance with some embodiment of the invention.

In addition to the benefits and improvements that the Specification discloses, other objects and advantages of that the Specification provides will become apparent from the following description taken in conjunction with the accompanying figures. Although the description discloses and describes detailed embodiments of the present disclosure, the disclosed embodiments are merely illustrative of the disclosure that may be embodied in various forms. In addition, each of the examples given regarding the various embodiments of the disclosure are intended to be illustrative, and not restrictive.

Throughout the specification and claims, the following terms take the meanings explicitly associated herein, unless the context clearly dictates otherwise. The phrases "in an embodiment," "in some embodiments," and any similar phrase, as used herein, do not necessarily refer to the same embodiment or embodiments, though the phrases may refer to the same embodiment or embodiments. Furthermore, the phrases "in another embodiment," and any similar phrase, as used herein, do not necessarily refer to a different embodiment, although the phrases may refer to a different embodiment. All embodiments of the disclosure are intended to be combinable without departing from the scope or spirit of the disclosure.

As used herein, terms such as "comprising," "including," "having," and any similar phrase, do not limit the scope of a specific claim to the materials or steps recited by the claim.

In some embodiments, the present invention provides a roofing membrane. In some embodiments, the roofing membrane includes a reinforcement material. In some embodiments, the roofing membrane includes granules applied to a reinforcement material. In some embodiments, the roofing membrane includes granules applied to a top surface of the reinforcement material, which is configured to be exposed to an outside environment after the roofing membrane is installed on a roofing substrate. In some embodiments, the reinforcement material is heated after the application of the granules. In some embodiments, a heater heats the reinforcement material after the application of the granules.

In some embodiments, an asphaltic material is applied to a reinforcement material. In some embodiments, first granules are applied to a top surface of the reinforcement material including the asphaltic material. In some embodiments, the reinforcing material is relatively flat during application of the first granules.

In some embodiments, the reinforcement material including the first granules is cooled. In some embodiments, a water bath cools the reinforcement material including the first granules.

In some embodiments, the cooled reinforcement material goes over a top surface of a turnaround drum, such that the top surface of the reinforcement material with the first granules does not contact a surface of the turnaround drum. In some embodiments, loose granules of the first granules, which did not adhere to the reinforcement material, are collected.

In some embodiments, a second drum compresses the first granules into the top surface of the reinforcement material.

In some embodiments, second granules are applied to the top surface of the reinforcement material. In some embodiments, the second granules fill in gaps or spaces between the first granules. In some embodiments, the second granules are relatively smaller than the first granules. In some embodiments, the reinforcing material is relatively flat during application of the second granules. In some embodiments, the first granules have an average grain size of between about 8 mesh and 40 mesh and the second granules have an average grain size of between about 30 mesh and 100 mesh.

In some embodiments, the reinforcement material is heated after application of the second granules. In some embodiments, a heater heats the reinforcement material after application of the second granules. In some embodiments, the reinforcement material is not heated between the heating prior to the application of the first granules, and the heating after the application of the second granules.

In some embodiments, when the reinforcement material is heated after application of the second granules and not before application of the second granules, the asphaltic material flows less around the first granules. In some embodiments, the first granules, and thus roofing membrane, exhibit less staining. In some embodiments, the first granules, and thus the roofing membrane, exhibits a higher solar reflectance.

In some embodiments, application of different size granules at different times provides enhanced surface coverage of the top surface of the reinforcement material by the granules.

In some embodiments, the reinforcement materials include one or more of, or all of, a glass reinforcement material, a polyester reinforcement material, a polyester reinforcement material, a scrim material, and/or a polymer reinforcement material, and/or combinations thereof.

In some embodiments, the asphaltic material includes one or more, or all of, of oxidized asphalt, or styrene-butadiene-styrene (SBS) modified asphalt, atactic polypropylene (APP) modified asphalt, and/or polymer modified asphalt, and/or combinations thereof.

In some embodiments, the roofing membrane complies with one or more of ASTM D6163-16, or ASTM D6164-21, ASTM D6222-16, ASTM D6222M-16, and/or ASTM D7530-17.

In some embodiments, the roofing membrane exhibits a solar reflectance of at least 0.70 before aging.

In some embodiments, the roofing membrane exhibits a solar reflectance of at least 0.65 after rapid aging testing. In some embodiments, the rapid aging testing is in accordance with ASTM D7897-15.

In some embodiments, a parting agent is applied to a back surface of the roofing membrane, which is opposite the top surface to which the granules are applied. In some embodiments, a polymer film is applied to the back surface of the roofing membrane. In some embodiments, sand is applied to the back surface of the roofing membrane. In some embodiments, a mineral is applied to the back surface of the roofing membrane. In some embodiments, the parting agent reduces sticking between the roofing membrane and components used in manufacture and/or handling of the roofing membrane. In some embodiments, the parting agent reduces transfer of either or both of asphalt and/or oil from the roofing membrane to components used in manufacture and/or handling of the roofing membrane.

In some embodiments, granules are applied more than two times to the top surface of the reinforcement material.

In some embodiments, a roofing system includes the roofing membrane installed on a steep slope roof substrate. In some embodiments, the roofing membrane is installed on a flat roof substrate. In some embodiments, the roofing membrane is installed on a sloped roof substrate, which is neither a steep slope roof substrate nor a flat roof substrate.

As used herein, a "steep slope roof substrate" is a roof substrate that is disposed on a building, having a pitch of Y/X, where Y and X are in a ratio of 4:12 to 20:12, where Y corresponds to the "rise" of the roof, and where X corresponds to the "run" of the roof.

As used herein, a "sloped roof substrate" is a roof substrate that is disposed on a building and which is sloped (e.g., is not flat), and which has a slope less than that of a steep slope roof substrate.

With reference to the drawings, FIG. 1 is a flowchart illustrating a process of manufacturing a roofing membrane, in accordance with some embodiment of the invention. As FIG. 1 illustrates, in some embodiments, an asphaltic material 510 is applied to a reinforcement material 520 at location 530 to form an asphaltic membrane. In some embodiments, the temperature of the asphaltic material 510 is 350 to 390 degrees Fahrenheit.

As FIG. 1 illustrates, in some embodiments, first granules 540 are applied to the reinforcement material 520, at a location 550 to form a granular asphaltic membrane. In some embodiments, the temperature of the reinforcement material 520 during application of the first granules 540 is 250 to 380 degrees Fahrenheit due to the high temperature that the asphaltic material was previously applied. However, the reinforcement material is not externally heated prior to or during the step of applying the first granules.

As FIG. 1 illustrates, in some embodiments, the reinforcement material 520 with the first granules 540 goes over turnaround drum 580, and a location 590. In some embodiments, the temperature of the granular asphaltic membrane 520 is 100 to 190 degrees Fahrenheit.

With reference to FIG. 1, in some embodiments, loose granules of the first granules 540, which do not adhere to the granular asphaltic membrane 520, fall of the granular asphaltic membrane 520, at and/or after location 590. In some embodiments, the temperature of the granular asphaltic membrane 520 when the loose granules fall off of the reinforcement material is 70 to 160 degrees Fahrenheit.

As FIG. 1 illustrates, in some embodiments, second granules 620 are applied to the top surface of the granular asphaltic membrane 520, at a location 630 to form an asphaltic roofing membrane. As discussed, in some embodiments, the second granules 620 are relatively smaller than the first granules 540, such that the second granules 620 fill in spaces or gaps between the first granules 540. In some embodiments, the temperature of the granular asphaltic membrane 520 when the second granules 620 are applied, is 60 to 150 degrees Fahrenheit. However, the granular asphaltic membrane is not externally heated prior to or during the step of applying the second granules.

As FIG. 1 illustrates, in some embodiments, the asphaltic roofing membrane with the first granules 540 and the second granules 620 is heated by an external heater 640 at a location 650. In some embodiments, the asphaltic roofing membrane with the first granules 540 and the second granules 620 is heated to a temperature of 200 to 250 degrees Fahrenheit.

Subsequently, the reinforcement material 520 is cut and rolled, thereby providing a roofing membrane.

In some embodiments, the first granules and/or the second granules are reflective granules.

In some embodiments, the first granules and/or the second granules are different sizes, material, and/or colors, thereby creating different design elements.

In some embodiments, the techniques described herein relate to a method of manufacturing an asphaltic roofing membrane, including: applying an asphaltic material to a reinforcement material to form an asphaltic membrane; preheating first granules; applying the first granules to a top surface of the asphaltic membrane to form a granular asphaltic membrane; wherein the asphaltic membrane is not heated prior to or during the step of applying the first granules; removing at least some of the first granules that has not adhered to the asphaltic membrane; applying a second granules to the granular asphaltic membrane to form an asphaltic roofing membrane; wherein the granular asphaltic membrane is not heated prior to or during the step of applying the second granules; heating the asphaltic roofing membrane.

In some embodiments, the techniques described herein relate to a method of manufacturing an asphaltic roofing membrane, including: applying an asphaltic material to a reinforcement material to form an asphaltic membrane; applying the first granules to a top surface of the asphaltic membrane to form a granular asphaltic membrane; wherein the asphaltic membrane is not heated prior to or during the step of applying the first granules; removing at least some of the first granules that has not adhered to the asphaltic membrane; preheating second granules; applying the second granules to the granular asphaltic membrane to form an asphaltic roofing membrane; wherein the granular asphaltic membrane is not heated prior to or during the step of applying the second granules; heating the asphaltic roofing membrane.

In some embodiments, the techniques described herein relate to the method wherein, prior to applying the second granules, preheating the second granules.

In some embodiments, the techniques described herein relate to a method wherein the heating step of at least the first granules, second granules or combination thereof includes heating the granules to between 150 to 250 degrees Fahrenheit.

In some embodiments, the techniques described herein relate to a method wherein the heating step of the granules includes heating the granules with an external heating source selected from the group consisting of IR heater, an oven, a hot air blower or any combination thereof.

In some embodiments, the techniques described herein relate to a method wherein the heating step includes heating the asphaltic roofing membrane with an external heating source selected from the group consisting of IR heater, an oven, a hot air blower or any combination thereof.

Figure 2B:
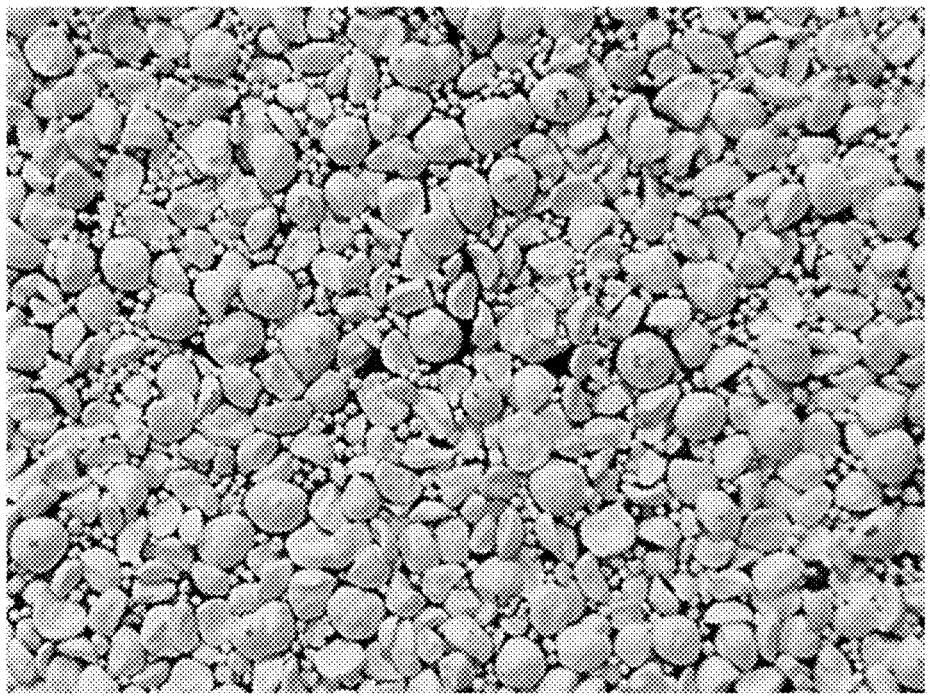
FIGS. 2A and 2B are photographs of an roofing membrane, according to some embodiments of the invention.
Figure 2A:
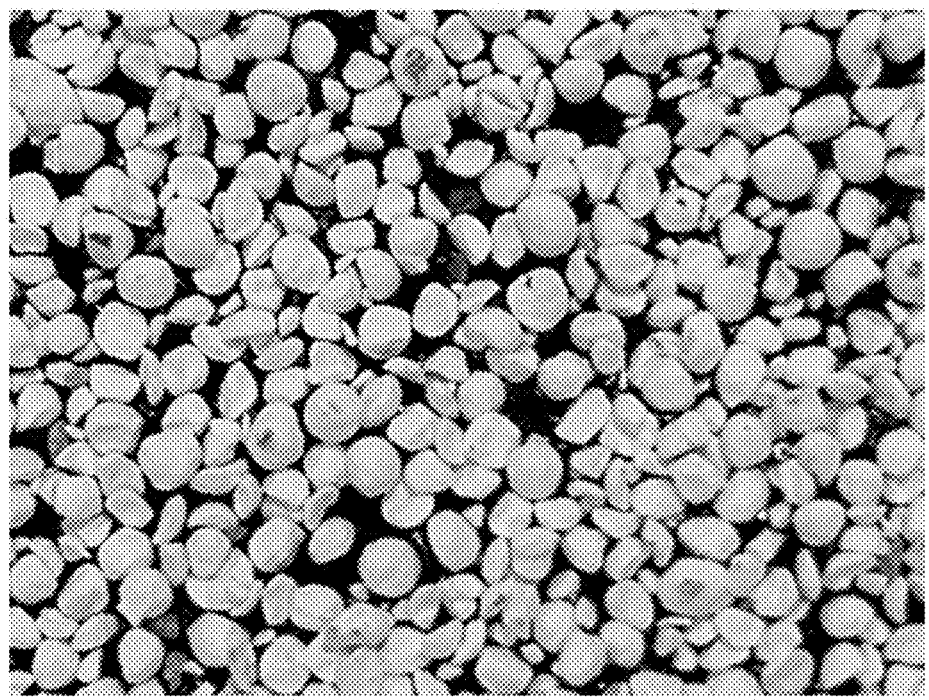

FIGS. 2A and 2B are photographs of an roofing membrane, according to some embodiments of the invention. FIG. 2A shows roofing membrane "A" with oxidized asphalt as the asphaltic material, with first granules applied on the top surface, while FIG. 2B shows the roofing membrane "A" with the first granules and second granules applied on the top surface, the second granules filling gaps between the first granules, in accordance with the above discussion.

Figure 3B:
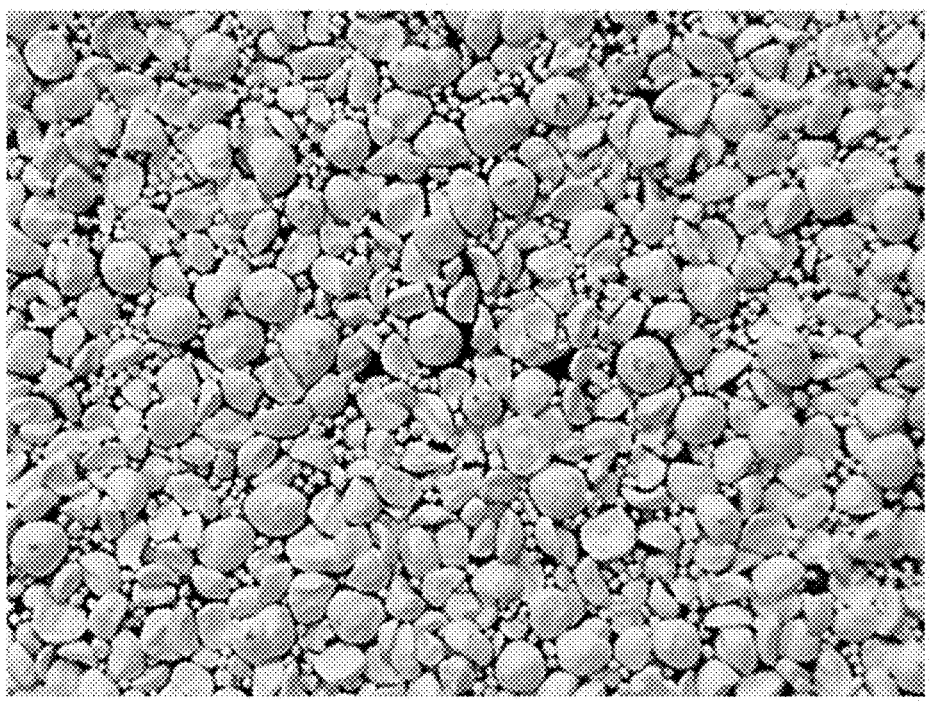
FIGS. 3A and 3B are photographs of an roofing membrane, according to some embodiments of the invention.
Figure 3A:
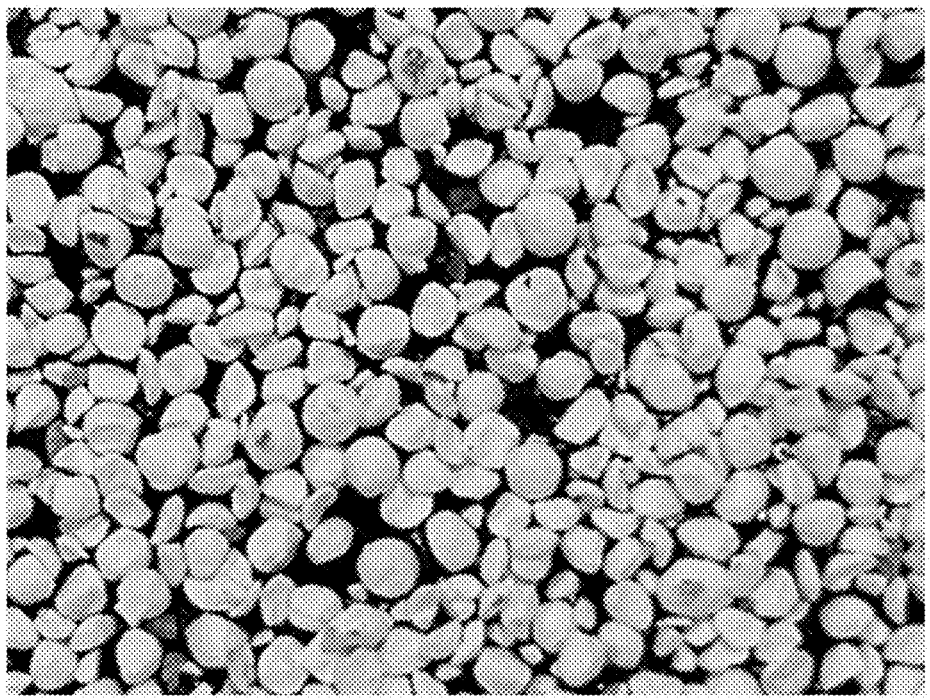

FIGS. 3A and 3B are photographs of an roofing membrane, according to some embodiments of the invention. FIG. 3A shows roofing membrane "B" with atactic polypropylene (APP) modified asphalt as the asphaltic material, with first granules applied on the top surface, while FIG. 3B shows the roofing membrane with the first granules and second granules applied on the top surface, the second granules filling in gaps between the first granules, in accordance with the above discussion.

Testing Before Rapid Aging Testing of Roofing Membrane "A"

Testing indicates that roofing membrane "A" has the following characteristics after application of the first granules but before application of the second granules, and before rapid aging testing:
Solar reflectivity: 0.67;
Emissivity: 0.87; and
Solar reflectance index: 81.
Testing indicates that roofing membrane "A" has the following characteristics after application of the first granules and the second granules, and before rapid aging testing:
Solar reflectivity: 0.74;
Emissivity: 0.88; and
Solar reflectance index: 91.

Testing after Rapid Aging Testing of Roofing Membrane "A"

Testing indicates that roofing membrane "A" has the following characteristics after application of the first granules but before application of the second granules, and after rapid aging testing:
Solar reflectivity: 0.56;
Emissivity: 0.87; and
Solar reflectance index: 66.
Testing indicates that roofing membrane "B" has the following characteristics after application of the first granules and the second granules, and after rapid aging testing:
Solar reflectivity: 0.66;
Emissivity: 0.88; and
Solar reflectance index: 80.

Testing Before Rapid Aging Testing of Roofing Membrane "B"

Testing indicates that roofing membrane "B" has the following characteristics after application of the first granules but before application of the second granules, and before rapid aging testing:
Solar reflectivity: 0.65;
Emissivity: 0.89; and
Solar reflectance index: 78.
Testing indicates that roofing membrane "B" has the following characteristics after application of the first granules and the second granules, and before rapid aging testing:
Solar reflectivity: 0.75;
Emissivity: 0.89; and
Solar reflectance index: 93.

Testing after Rapid Aging Testing of Roofing Membrane "B"

Testing indicates that roofing membrane "B" has the following characteristics after application of the first granules but before application of the second granules, and after rapid aging testing:
Solar reflectivity: 0.58;
Emissivity: 0.89; and
Solar reflectance index: 69.
Testing indicates that roofing membrane "B" has the following characteristics after application of the first granules and the second granules, and before rapid aging testing:
Solar reflectivity: 0.65;
Emissivity: 0.89; and
Solar reflectance index: 78.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

What is claimed:

1. A method of manufacturing an asphaltic roofing membrane, comprising:
applying an asphaltic material to a reinforcement material to form an asphaltic membrane;
applying a first granules to a top surface of the asphaltic membrane to form a granular asphaltic membrane
wherein the asphaltic membrane is not heated prior to or during the step of applying the first granules,
wherein, from the start of applying the first granules until all loose first granules have been adhered, the asphaltic membrane is maintained in a planar configuration and is not in contact with or supported by any roll or arcuate surface;
removing at least some of the first granules that have not adhered to the asphaltic membrane to form a granular asphaltic membrane;
applying a second granules to the granular asphaltic membrane to form an asphaltic roofing membrane
wherein the granular asphaltic membrane is not heated prior to or during the step of applying the second granules,
wherein, from the start of applying the second granules until all loose second granules have been adhered, the asphaltic membrane is maintained in a planar configuration and is not in contact with or supported by any roll or arcuate surface;

heating the asphaltic roofing membrane;
after heating the membrane, cutting the asphaltic membrane; and
rolling the cut membrane.

2. The method of claim 1 wherein the heating step comprises heating the asphaltic roofing membrane to between 200 to 250 degrees Fahrenheit.

3. The method of claim 1 wherein at least the first granules, the second granules, or combination thereof are reflective granules.

4. The method of claim 1 wherein at least the first granules, the second granules, or combination thereof are different sizes, material, and/or colors, thereby creating different design elements.

5. The method of claim 4, wherein the second granules are smaller than the first granules.

6. The method of claim 1 wherein the heating the asphaltic roofing membrane step comprises heating the asphaltic roofing membrane with an external heating source selected from the group consisting of an IR heater, an oven, a hot air blower and any combination thereof.

7. The method of claim 1 wherein the reinforcement material is a glass reinforcement material, a polyester reinforcement material, a scrim material, a polymer reinforcement material, or combinations thereof.

8. The method of claim 1 wherein the asphaltic material includes oxidized asphalt, or styrene-butadiene-styrene (SBS) modified asphalt, atactic polypropylene (APP) modified asphalt, polymer modified asphalt, or combinations thereof.

9. The method of claim 1 wherein the heated asphaltic roofing membrane exhibits a solar reflectance of at least 0.70 before aging.

10. The method of claim 1 wherein the heated asphaltic membrane exhibits a solar reflectance of at least 0.65 after rapid aging testing in accordance with ASTM D7897-15.

11. A method of manufacturing an asphaltic roofing membrane, comprising:
applying an asphaltic material to a reinforcement material to form an asphaltic membrane;
preheating the first granules;
applying the first granules to a top surface of the asphaltic membrane to form a granular asphaltic membrane,
wherein the asphaltic membrane is not heated prior to or during the step of applying the first granules,
wherein, from the start of applying the first granules until all loose first granules have been adhered, the asphaltic membrane is maintained in a planar configuration and is not in contact with or supported by any roll or arcuate surface;
removing at least some of the first granules that have not adhered to the asphaltic membrane to form a granular asphaltic membrane;
applying second granules to the granular asphaltic membrane to form an asphaltic roofing membrane
wherein the granular asphaltic membrane is not heated prior to or during the step of applying the second granules,
wherein, from the start of applying the second granules until all loose second granules have been adhered, the asphaltic membrane is maintained in a planar configuration and is not in contact with or supported by any roll or arcuate surface;
heating the asphaltic roofing membrane;
after heating the membrane, cutting the asphaltic membrane; and
rolling the cut membrane.

12. The method of claim 11 wherein, prior to applying the second granules, preheating the second granules.

13. The method of claim 11, wherein the heating step of at least the first granules, second granules or combination thereof comprises heating the granules to between 150 to 250 degrees Fahrenheit.

14. The method of claim 11, wherein at least the first granules, the second granules or the combination thereof are reflective granules.

15. The method of claim 11, wherein at least the first granules, the second granules or the combination thereof are different sizes, material, and/or colors, thereby creating different design elements.

16. The method of claim 11, wherein the heating step of the granules comprises heating the granules with an external heating source selected from the group consisting of IR heater, an oven, a hot air blower or any combination thereof.

17. The method of claim 11, wherein the heating the asphaltic roofing membrane step comprises heating the asphaltic roofing membrane with an external heating source selected from the group consisting of an IR heater, an oven, a hot air blower and any combination thereof.

* * * * *